United States Patent [19]
Sieren

[11] 3,821,997
[45] July 2, 1974

[54] PIVOTAL BATTERY MOUNT
[75] Inventor: Gerald E. Sieren, Greendale, Wis.
[73] Assignee: Allis-Chalmers Corporation, Milwaukee, Wis.
[22] Filed: May 11, 1972
[21] Appl. No.: 252,200

[52] U.S. Cl. .......................... 180/68.5, 248/361 R
[51] Int. Cl. ............................................ B60r 18/02
[58] Field of Search ........ 180/68.5; 105/51; 211/96, 211/97; 248/361 R, 289

[56] References Cited
UNITED STATES PATENTS
| | | | |
|---|---|---|---|
| 1,081,706 | 12/1913 | Thompson | 105/51 |
| 1,138,122 | 5/1915 | Lambert et al. | 180/68.5 |
| 2,158,784 | 5/1939 | Dean | 105/51 |
| 2,709,494 | 5/1955 | Luce | 180/68.5 |
| 2,717,802 | 9/1955 | Martin | 248/289 X |
| 2,985,351 | 5/1961 | Du Shane et al. | 180/68.5 X |
| 3,265,148 | 8/1966 | Foxwell | 180/68.5 |
| 3,350,856 | 11/1967 | Revell | 211/96 X |

FOREIGN PATENTS OR APPLICATIONS
204,901   1/1959   Austria ........................ 180/68.5

Primary Examiner—Leo Friaglia
Assistant Examiner—David M. Mitchell
Attorney, Agent, or Firm—Arthur L. Nelson

[57] ABSTRACT

A battery mount pivotally supporting the vehicle battery for readily servicing or latching the battery in the operative position on the vehicle chassis.

9 Claims, 6 Drawing Figures

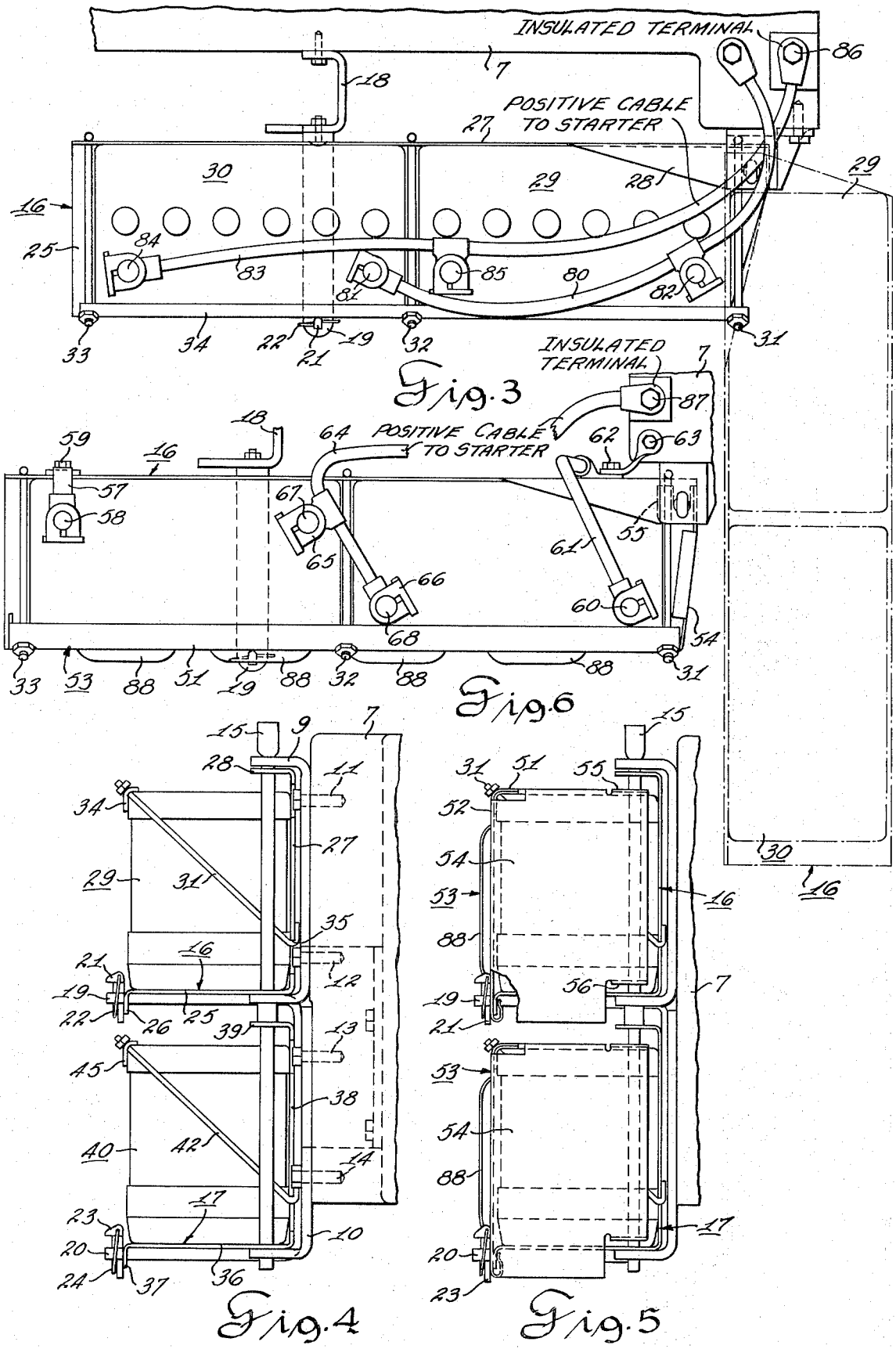

PIVOTAL BATTERY MOUNT

This invention relates to a vehicle battery mount and more particularly to a pivotal battery mount for pivoting outwardly from the vehicle for readily servicing the battery and pivoting inwardly for latching the battery in the operative position.

Increased demands of the modern tractor require an increasing amount of auxiliary equipment. This increased amount of auxiliary equipment requires additional space for mounting of the equipment on the vehicle. With the increase in size of the vehicle and demand for electrical energy, it is often necessary to include more than one battery on the vehicle for starting purposes and also to run auxiliary equipment. Accordingly, it is becoming difficult to find a place to mount the battery and still maintain the convenience of servicing the battery which is so necessary to maintain the battery in good operating condition. It is also necessary that the battery be positioned in a location where it does not become overheated. Accordingly, this invention provides a means for mounting the battery on the side of the vehicle underneath the platform to pivotally swing outwardly to permit servicing the battery, to have access to vehicle component behind the battery, and to swing back against the vehicle chassis to a latched position for normal operation. Mounting the battery under the platform and outside of the cab provide safety for the operator in case of rollover.

It is an object of this invention to provide a pivotal battery mount pivotally supported on a vehicle.

It is another object of this invention to provide a battery mount for pivotally supporting the battery and pivotally moving away from the vehicle for servicing and pivotally swinging toward the vehicle to a latched position during operation of the vehicle.

It is a further object of this invention to provide a pivotal mount for a plurality of batteries on the vehicle chassis to pivot underneath the operator's platform in the normal operating position and pivot outwardly to readily service the batteries.

The objects of this invention are accomplished by pivotally supporting a first battery tray on the vehicle chassis on the edge of the operator platform. A second battery tray is pivotally mounted above the first battery tray for pivotal movement about the same axis of movement as the first battery tray. Cable connections connect to the battery terminals and connect to a point adjacent the pivotal support of the battery trays to permit free pivotal movement of the trays. A hold-down clamp means retain each of the batteries on their respective tray and a latching arrangement latches the batteries in their normal operating position.

Referring to the drawings, the preferred embodiments of the invention are illustrated.

FIG. 3 is a plan view of the pivotal mounting of the batteries.

FIG. 4 is an end view of the pivotal mounting of the batteries.

FIG. 5 illustrates an end view of a modification of the pivotal battery mount showing a battery cover for each battery tray and an alternate ground cable arrangement.

FIG. 6 is a plan view of a modification of the pivotal battery mount showing the battery cover connected to the top battery tray.

Figure 1:
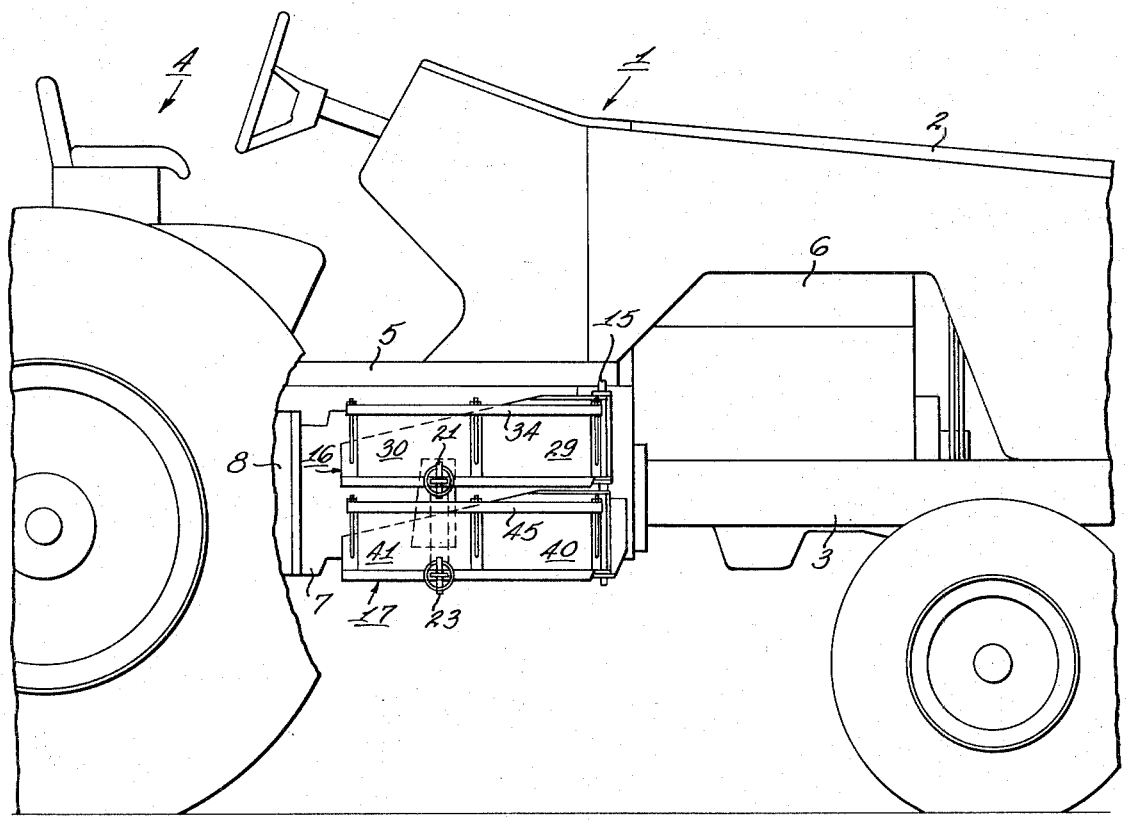
FIG. 1 illustrates the pivotal battery mounts pivotally supported on the side of the vehicle.
Figure 2:
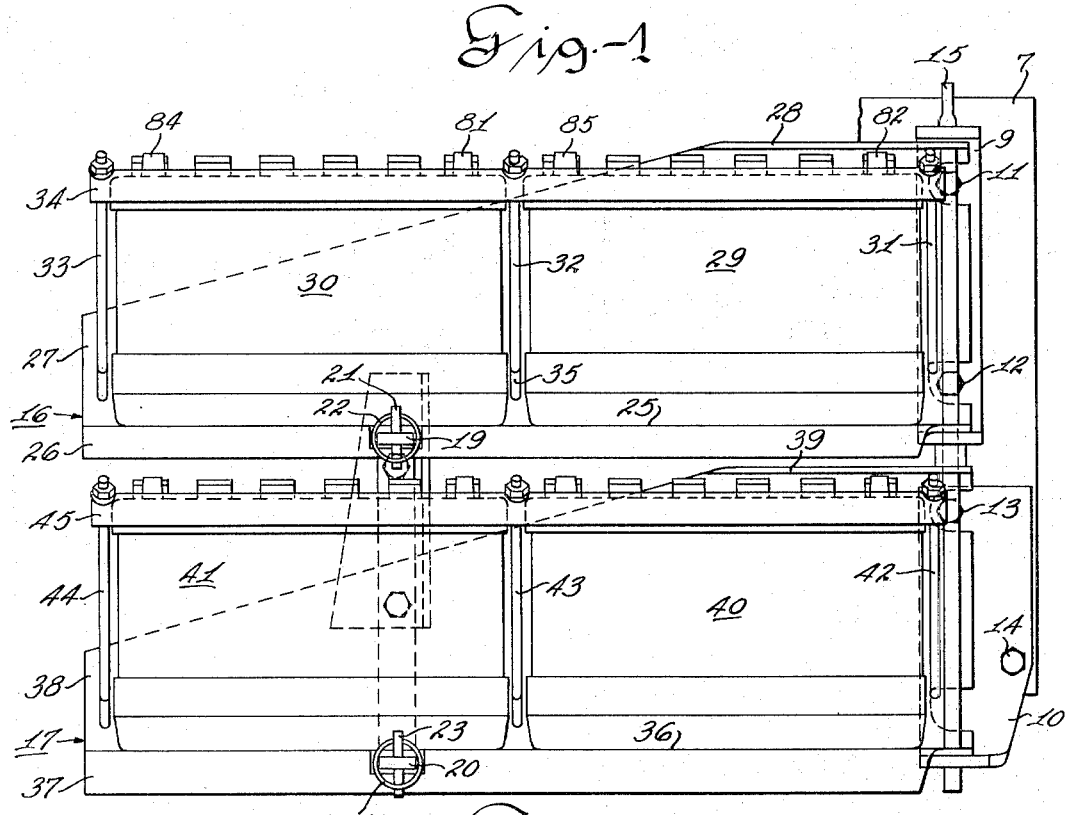
FIG. 2 illustrates an enlarged side elevation view of the pivotal mounting of the batteries.

Referring to the drawings, FIG. 1 shows a tractor 1 having an engine hood 2 supported on the vehicle chassis 3. The operator station 4 includes the platform 5 supported on the vehicle chassis 3. The engine 6 is connected to the transmission housing 7 which drives through the rear drive assembly 8.

The transmission housing 7 carries the supporting structure for pivotally mounting the batteries. The support brackets 9 and 10 are fastened by the plurality of bolts 11, 12, 13, 14. The bracket 9 carries a pivot pin 15 which extends through axially aligned holes in the brackets 9 and 10.

Similarly the battery trays 16 and 17 define axially aligned holes which also receive the pivot pin 15 to pivotally support the trays 16 and 17 on the brackets 9 and 10, respectively. While the trays 16 and 17 are pivotally supported on their forward ends on the brackets 9 and 10, they are also supported at a point rearwardly of the pivot pin 15. The support 18 fastened to the chassis 7 carries the crossbars 19 and 20. The crossbar 19 supports the tray 16 while the crossbar 20 supports the tray 17. Crossbar 19 carries a latching pin 21 having a locking ring 22. Crossbar 20 carries a latching pin 23 carrying a locking ring 24.

Tray 16 includes a base plate 25 with a depending flange 26 which engages the crossbar 19 and latch pin 21 in the latched position. The tray 16 also includes a vertical wall 27 extending upwardly to connect to the flange 28 defining the hole for receiving the pin 15. The tray 16 extends rearwardly from the pivot pin 15 a sufficient distance to support batteries 29 and 30.

The batteries 29 and 30 are held by the clamping arrangement consisting of the tie bolts 31, 32 and 33 connected to the strap 34. Each of the tie bolts 31, 32 and 33 engages a slot similar to slot 35 in the vertical wall 27 of the tray 16. The tie bolts are positioned to produce vertical and horizontal components of force to securely press the batteries inwardly and downwardly onto the tray to firmly secure the batteries on the tray.

Tray 17 is mounted on the pivot pin 15 by means of vertically aligned holes in the tray. The tray consists of the base plate 36 connected to the depending flange 37 which engages the crossbar 20 and latch pin 23 when the tray is in its normally latched position. The tray 17 also defines a vertical wall 38 and flange 39. Flange 39 provides support for the pivotal end of the bracket as well as the base plate 36.

The tray 17 also extends rearwardly to provide support for the two batteries 40 and 41. The batteries 40 and 41 are held down by a plurality of tie bolts 42, 43 and 44 which are fastened to the strap 45. When the tie bolts 42, 43 and 44 are tightened down, the battery is snugly held against the vertical wall 38 and the base plate 36.

FIG. 3 illustrates a tray in phantom pivotally moved away from the vehicle to provide servicing. Either tray may be pivoted singularly for servicing of the battery. Cable 80 is connected to terminals 81 and 82 and chassis 7. Cable 83 is connected to the starter through insulated terminal 86 and to positive terminals 84 and 85.

FIGS. 5 and 6 illustrate a cover for the battery which is pivoted away with the battery supporting structure to permit access to the batteries as they are pivoted outwardly from the vehicle.

Referring to FIGS. 5 and 6 a modification of the pivotal battery mount is shown. The modification includes essentially the same structure shown in FIGS. 3 and 4 with a battery cover connected to each battery tray. Since the top tray and the bottom tray and the cover connected therewith are the same, this description will specifically describe the cover for the upper tray since it is illustrated in both FIGS. 5 and 6. It is understood that the description applies to the lower tray as well with regard to the specific mounting of the cover on the tray. The tray 16 is pivotally supported on the pin 15. The bolts 31, 32 and 33 clamp against the horizontal flange 51 where it connects the side plate 52 of the cover 53. Side plate 52 is formed with a plurality of louvers 88 for ventilation. The cover 53 includes an end plate 54 which is part of the integral structure of the cover 53. The end plate 54 extends upwardly to form a bifurcated end portion 55 which engages the pin 15. The end plate 54 also extends downwardly to form a similarly bifurcated portion 56 to engage the pin 15. As the cover 53 is clamped by means of the bolts 31, 32 and 33, it firmly seats on the pin 15 through the bifurcated portions 55 and 56 to pivot with the tray when the battery tray is pivoted.

Accordingly, the battery cover 53 covers the end and the side of the battery and permits servicing of the battery from the top side. It is understood that the top side of the battery normally swings underneath the platform and would ordinarily not need a protection or cover during operation. It is further understood that a cover on the top of the battery would necessitate its removal for servicing of the battery and as a matter of convenience the present arrangement operates more satisfactorily.

FIGS. 5 and 6 also illustrate a modification of cable connections in which the cable 57 is connected to the negative terminal 58 and by means of a bolt 59 to the tray 16. The negative terminal 60 is also connected through a cable 61 and connected to the tray 16 by means of the bolt 62 and connected by a bolt 63 to the chassis of the vehicle. The positive cable 64 has connectors 65 and 66 connected to the positive terminals 67 and 68. The positive cable is adapted for connection to the starter of the vehicle and other suitable electrical connectors to the positive side of the electrical circuit on the vehicle through insulated terminal 87.

The operation of this device will be described in the following paragraph.

A tray 16 is pivotally supported on the pin 15 which in turn is pivotally connected to the bracket 9. The bracket 9 is mounted on the chassis 7. Similarly the tray 17 is pivotally supported on the pin 15 which permits pivotal movement of either tray 16 or 17 away from the battery when it is unlatched. The latching arrangement consists of the crossbar 19 carrying a pin 21 and a locking ring 22. The locking ring 22 is merely rotated to a position to permit raising the pin 21 from the crossbar 19 and unlatching of the tray 16. Accordingly, the tray 16 will pivotally rotate on its axis of rotation of pin 15, as shown in FIG. 3. Either tray 16 or 17 may be pivoted to the position shown in phantom of FIG. 3. The latching arrangement for the battery tray 17 is the same as for the battery tray 16. When either of the trays 16 or 17 are in their latched position, they are supported by the pin 15, as well as a crossbar 19 supporting tray 16 and the crossbar 20 supporting tray 17. The hold-down clamps securely lock the batteries in the firm seating arrangement as shown in FIG. 4 by the clamping arrangement of the diagonally positioned tie bolts. It is noted that the latching pins firmly seat against the dependent flanges to press the trays in their normal operating position.

The embodiments of the invention in which an exclusive property or privilege is claimed are defined as follows:

1. A pivotally mounted vehicle battery support comprising, a vehicle including, a vehicle chassis, a battery tray including a vertical wall supporting at least one battery, a battery clamp connected to said tray continuously holding said battery on said tray, pivotal support means including a bracket mounted on said vehicle by the side of said chassis defining a vertical pivotal axis including a pin pivotally supporting said tray along said vertical wall for swinging movement away from said chassis, a tray support mounted on said vehicle by the side of said vehicle chassis in spaced relation to said pivotal support means and extending transversely from said vehicle chassis for supporting a portion of said tray in its normal operating position adjacent said vehicle chassis, a latch element mounted on said tray support engaging said tray for retaining said tray and battery in its normal operating position, a platform extending in spaced relation over said battery tray and battery in its normal operating position and permitting pivotal movement of said battery tray and battery from under said platform, said pivotal support means supporting said battery tray and battery at a level below said platform for battery servicing.

2. A pivotally mounted vehicle battery support as set forth in claim 1 including a plurality of battery trays adapted for support on said vehicle chassis.

3. A pivotally mounted vehicle battery support as set forth in claim 2 wherein said pivotal support means defines a common pivotal axis for said plurality of battery trays.

4. A pivotally mounted vehicle battery support as set forth in claim 1 wherein said tray support includes a bar extending underneath said battery tray, a lock pin connected to said bar to latch said tray in its normal operating position adjacent said vehicle chassis.

5. A pivotally mounted vehicle battery support as set forth in claim 1 wherein said tray defines means for supporting at least two batteries.

6. A pivotally mounted vehicle battery support as set forth in claim 1 including a battery cover connected to said battery tray for covering said battery.

7. A pivotally mounted vehicle battery support as set forth in claim 1 including a pivot pin connected to said chassis for pivotally supporting said tray, battery cables connected to said battery and extending to a point adjacent said pin for connection to an electrical circuit on said vehicle to thereby pivot said trays from under said platform to the normal servicing position and pivot said tray under said platform in its normal operating position without interference from said cables.

8. A pivotally mounted vehicle battery support as set forth in claim 1 wherein said vehicle chassis includes a transmission housing, a bracket connected to said transmission housing, a pin pivotally connected between said bracket and said tray to thereby pivotally support said tray on said pin.

9. A pivotally mounted vehicle battery support as set forth in claim 1 wherein said tray defines an L-shaped cross section including a base plate for supporting a battery, a vertical wall for abutting against the side of a battery, hold-down clamp means for firmly seating said battery against said base plate and said vertical wall and locking said battery on said battery tray.

* * * * *